United States Patent [19]

Mazanec et al.

[11] Patent Number: 5,788,748
[45] Date of Patent: Aug. 4, 1998

US005788748A

[54] OXYGEN PERMEABLE MIXED CONDUCTOR MEMBRANES

[75] Inventors: Terry J. Mazanec, Solon; Thomas L. Cable, Newbury, both of Ohio

[73] Assignee: The Standard Oil Company, Cleveland, Ohio

[21] Appl. No.: 575,412

[22] Filed: Dec. 20, 1995

Related U.S. Application Data

[62] Division of Ser. No. 311,295, Sep. 23, 1994, abandoned.

[51] Int. Cl.⁶ .................. B01D 53/22; B01D 71/02
[52] U.S. Cl. .......................... 96/4; 95/54; 96/11
[58] Field of Search ................... 95/45, 54; 96/4, 96/11

[56] References Cited

U.S. PATENT DOCUMENTS

| | | | |
|---|---|---|---|
| 2,444,222 | 6/1948 | Craig | 123/119 |
| 3,359,705 | 12/1967 | Mulhaupt | 55/16 |
| 3,509,694 | 5/1970 | Yunoshin et al. | 55/16 |
| 4,151,060 | 4/1979 | Isenberg | 204/195 S |
| 4,330,633 | 5/1982 | Yoshisato et al. | 501/152 |
| 4,483,694 | 11/1984 | Takamura et al. | 55/158 |
| 4,599,157 | 7/1986 | Shuzuki et al. | 204/192 SP |
| 4,791,079 | 12/1988 | Hazbun | 502/4 |
| 4,827,071 | 5/1989 | Hazbun | 585/443 |
| 4,851,303 | 7/1989 | Madou | 429/13 |
| 4,885,142 | 12/1989 | Suitor et al. | 423/219 |
| 4,888,033 | 12/1989 | Charpin et al. | 55/158 |
| 5,061,682 | 10/1991 | Aksay et al. | 505/1 |
| 5,108,465 | 4/1992 | Bauer et al. | 95/54 |
| 5,118,395 | 6/1992 | Chen et al. | 95/54 X |
| 5,160,713 | 11/1992 | Mazanec et al. | 95/54 X |
| 5,169,415 | 12/1992 | Roettger et al. | 96/4 X |
| 5,174,866 | 12/1992 | Chen et al. | 95/54 X |
| 5,240,473 | 8/1993 | Carolan et al. | 96/4 X |
| 5,240,480 | 8/1993 | Thorogood et al. | 96/4 |
| 5,261,932 | 11/1993 | Carolan et al. | 95/54 |
| 5,447,555 | 9/1995 | Yee et al. | 95/54 |
| 5,516,359 | 5/1996 | Kang et al. | 95/54 X |

FOREIGN PATENT DOCUMENTS

| | | | |
|---|---|---|---|
| 0362898 | 4/1990 | European Pat. Off. | 95/54 |
| 0399833 | 11/1990 | European Pat. Off. | |
| 56-092103 | 7/1981 | Japan . | |
| 57-145069 | 9/1982 | Japan | 95/54 |
| 61-002548 | 1/1986 | Japan | 96/11 |
| 61-021717 | 1/1986 | Japan . | |
| 63-156515 | 6/1988 | Japan | 96/4 |
| 63-156516 | 6/1988 | Japan | 96/11 |
| 2257054 | 1/1993 | United Kingdom | 95/54 |

OTHER PUBLICATIONS

"Development of Oxygen Semipermeable Membrane Using Mixed Conductive Perovskite–Type Oxides (Part–2)–Preparation of Dense Film of Perovskite–Type Oxide on Porous Substrate," pp. 523–529, Journal of the Ceramic Society of Japan (1989) Teraoka, Y. et al.

"Spray Pyrolysis of Multicomponent Ceramic Powders", pp. 99–106, Ceram. Trans., vol. 12, Ceramic Powder Science 3 (1990).

"Effect of Cation Substitution on the Oxygen Semipermeability of Perovskite–Type Oxides", pp. 503–506, The Chemical Society of Japan, (1988) Y. Teraoka, et al.

*Primary Examiner*—Robert Spitzer
*Attorney, Agent, or Firm*—David J. Untener; Michael F. Esposito; Brian L. Mehosky

[57] ABSTRACT

The present invention relates to novel solid state mixed conductor membranes and their use for separating oxygen from oxygen-containing feeds at elevated temperatures. The membranes comprise a multicomponent metallic oxide of substantially cubic perovskite structure, stable in air over the temperature range of 25°–950° C., having no connected through porosity wherein the membrane is of a composition represented by the formula $[A_{1-x}A'_x][Co_{1-y-z}B_yB'_z]O_{3-\delta}$, where A≡Ca, Sr, Ba, and mixtures thereof; A'≡La, Y, Ce, Pr, Nd, Pm, Sm, Eu, Gd, Tb, Dy, Ho, Er, Tm, Yb, Lu, Th, U, and mixtures thereof; B≡Fe, Mn, Cr, V, Ti, and mixtures thereof; B'≡Cu, Ni, and mixtures thereof; $-0.0001 \leq x \leq -0.1$; $-0.002 \leq y < 0.05$; $-0.0005 \leq z \leq -0.3$; δ is determined by the valence of the metals.

2 Claims, No Drawings

OXYGEN PERMEABLE MIXED CONDUCTOR MEMBRANES

This is a divisional of co-pending application Ser. No. 08/311.295 filed Sep. 23, 1994, now abandoned.

TECHNICAL FIELD OF THE INVENTION

The present invention relates to novel mixed conductor membranes formed from mixed conducting oxides and processes which employ such membranes. One such process is the separation of oxygen from oxygen-containing feeds at elevated temperatures. The membranes are conductors of oxygen ions and electrons, and are of a composition that forms a substantially cubic perovskite structure, substantially stable in air over the temperature range of 25°–950° C.

Applicants have discovered a composition which stabilizes the cubic perovskite phase in membranes with compositions previously unable to sustain a stable cubic perovskite phase over the range from ambient temperature and pressure in air to the conditions used for oxygen separation. In particular, slight amounts of A site cations and slight amounts of B site cations stabilize a substantially cubic perovskite structure in ABCoO materials. Additionally, the addition of slight amounts of A site cations and B site cations yields cubic perovskite phase materials in ABCoO materials which would otherwise yield hexagonal phase materials which produce membranes with low oxygen flux.

BACKGROUND OF THE INVENTION

Solid state membranes formed from oxygen ion conducting materials are beginning to show promise for use in commercial processes for separating oxygen from oxygen-containing streams. Envisioned applications range from small scale oxygen pumps for medical use to large gas generation and purification plants. This technology encompasses two distinctly different membrane materials, solid electrolytes and mixed conductors. Membranes formed from mixed conductors are preferred over solid electrolytes in processes for separating oxygen from oxygen-containing feeds because mixed conductors conduct both oxygen ions and electrons, and can be operated without external circuitry such as electrodes, interconnects and power-supplies. In contrast, solid electrolytes conduct only oxygen ions, and external circuitry is needed to maintain the flow of electrons to maintain the membrane ionization/deionization process. Such circuitry can add to unit cost, as well as complicate cell geometry.

Membranes formed from solid electrolytes and mixed conducting oxides are oxygen selective and can transport oxygen ions through dynamically formed oxygen anion vacancies in the solid lattice when operated at temperatures typically above about 500° C. Examples of solid electrolytes include yttria-stabilized zirconia (YSZ) and bismuth oxide. Examples of mixed conductors include titania-doped YSZ, praseodymia-modified YSZ, and, more importantly, various mixed metal oxides some of which possess the perovskite structure. Japanese Patent Application No. 61-21717 discloses membranes formed from multicomponent metallic oxides having the perovskite structure represented by the formula $La_{1-x}Sr_xCo_{1-y}Fe_yO_{3-d}$ wherein x ranges from 0.1 to 1.0, y ranges from 0.05 to 1.0 and d ranges from 0.5 to 0.

Membranes formed from mixed conducting oxides which are operated at elevated temperatures can be used to selectively separate oxygen from an oxygen-containing feed when a difference in oxygen partial pressures exist on opposite sides of the membrane. Oxygen transport occurs as molecular oxygen is dissociated into oxygen ions, which ions migrate to the low oxygen partial pressure side of the membrane where the ions recombine to form oxygen molecules, and electrons migrate through the membrane in a direction opposite the oxygen ions to conserve charge.

The rate at which oxygen permeates through a membrane is mainly controlled by three factors. They are (a) the kinetic rate of the feed side interfacial oxygen exchange, i.e., the rate at which oxygen molecules in the feed are converted to mobile oxygen ions at the surface of the feed side of the membrane; (b) the diffusion rates of oxygen ions and electrons within the membrane; and (c) the kinetic rate of the permeate side interfacial oxygen exchange, i.e., the rate at which oxygen ions in the membrane are converted back to oxygen molecules and released on the permeate side of the membrane.

U.S.Pat. No. 5,240,480 to Thorogood, et al, incorporated herein by reference, addressed the kinetic rate of the feed side interfacial oxygen exchange by controlling the pore size of the porous structure supporting a non-porous dense layer. Numerous references, such as U.S. Pat. No. 4,330,633 to Yoshisato et al, Japanese Kokai No. 56|1981|-92,103 to Yamaji, et al, and the article by Teraoka and coworkers, *Chem. Letters, The Chem. Soc. of Japan*, pp. 503–506 (1988) describe materials with enhanced ionic and electronic conductive properties.

Typical of metal oxide membrane references is Japanese Patent Application 61-21717, described above. When an oxygen-containing gaseous mixture at a high oxygen partial pressure is applied to one side of a membrane having a dense layer formed from the enumerated oxide, oxygen will adsorb and dissociate on the membrane surface, become ionized and diffuse through the solid and deionize, associate and desorb as an oxygen gas stream at a lower oxygen partial pressure on the other side of the membrane.

The necessary circuit of electrons to supply this ionization/deionization process is maintained internally in the oxide via its electronic conductivity. This type of separation process is described as particularly suitable for separating oxygen from a gas stream containing a relatively high partial pressure of oxygen, i.e., greater than or equal to 0.2 atm. Multicomponent metallic oxides which demonstrate both oxygen ionic conductivity and electronic conductivity typically demonstrate an oxygen ionic conductivity ranging from 0.01 $ohm^{-1}$ $cm^{-1}$ to 100 $ohm^{-1}$ $cm^{-1}$ and an electronic conductivity ranging from about 1 $ohm^{-1}$ $cm^{-1}$ to 100 $ohm^{-1}$ $cm^{-1}$.

Some multicomponent metallic oxides are primarily or solely oxygen ionic conductors at elevated temperatures. An example is $(Y_2O_3)_{0.1}(Zr_2O_3)_{0.9}$ which has an oxygen ionic conductivity of 10 $ohm^{-1}$ $cm^{-1}$ at 1000° C. and an ionic transport number (the ratio of the ionic conductivity to the total conductivity) close to 1. European Patent Application EP 0399833A1 describes a membrane formed from a composite of this oxide with a separate electronically conducting phase, such as platinum or another noble metal. The electronic conducting phase will provide the return supply of electrons through the structure allowing oxygen to be tonically conducted through the composite membrane under a partial pressure gradient driving force.

Another category of multicomponent metallic oxides exhibit primarily or solely electronic conductivity at elevated temperatures and their ionic transport numbers are close to zero. An example is $Pr_xIn_yO_z$ which is described in European Patent Application EP 0,399,833 A1. Such materials may be used in a composite membrane with a separate oxygen ionic conducting phase such as a stabilized $ZrO_2$. A membrane constructed from a composite of this type may also be used to separate oxygen from an oxygen-containing stream, such as air, by applying an oxygen partial pressure gradient as the driving force. Typically, the multicomponent oxide electronic conductor is placed in intimate contact with an oxygen ionic conductor.

Organic polymeric membranes may also be used for oxygen separation. However, membranes formed from mixed conducting oxides offer substantially superior oxygen selectivity than polymeric membranes. The value of such improved selectivity must be weighed against the higher costs associated with building and operating plants employing membranes formed from mixed conducting oxides which plants require heat exchangers, high temperature seals and other costly equipment. Typical prior art membranes formed from mixed conducting oxides do not exhibit sufficient oxygen permeance (defined as a ratio of permeability to thickness) to justify their use in commercial oxygen separation applications.

Oxygen permeance through solid state membranes is known to increase proportionally with decreasing membrane thickness, and mechanically stable, relatively thin membrane structures have been widely studied.

A second article by Teraoka et al, *Jour. Ceram. Soc. Japan*, International Ed. Vol 97, pp 458–462, (1989) and *J. Ceram. Soc. Japan, International Ed.* Vol 97, pp 523–529, (1989), for example, describes solid state gas separation membranes formed by depositing a dense, nonporous mixed conducting oxide layer, referred to as "the dense layer", onto a porous mixed conducting support. The relatively thick porous mixed conducting support provides mechanical stability for the thin, relatively fragile dense, nonporous mixed conducting layer. Structural failures due to thermo-mechanical stresses experienced by the membranes during fabrication and use were substantially minimized due to the chemical compatibility of the respective membrane layers. Based upon considerations limited to dense layer thickness, Teraoka and coworkers expected the oxygen flux to increase by a factor of 10 for a membrane having a mixed conducting porous layer and a thin mixed conducting dense layer compared to a standard single layered dense, sintered mixed conducting disc. However, they obtained an increase of less than a factor of two.

Researchers are continuing their search for solid state conductive membranes which exhibit superior oxygen flux without sacrificing mechanical and physical compatibility of the composite membrane.

BRIEF SUMMARY OF THE INVENTION

The present invention relates to novel mixed conductor membranes which are capable of separating oxygen from oxygen-containing feeds at elevated temperatures. The membranes have a structure and composition that forms a substantially cubic perovskite structure, substantially stable in air over the temperature range of 25°–950° C. such that enhanced oxygen flux is observed compared to prior art solid state membranes.

While membranes are known which comprise a mixed conducting oxide layer, the membranes of the present invention have a composition that forms a substantially cubic perovskite structure. Such structures exhibit enhanced oxygen flux. The addition of specific transition metals at relatively low concentrations to mixed metal oxides which would otherwise form hexagonal phase materials stabilizes a cubic perovskite structure in the resulting mixed conducting membrane. Membranes fabricated from such material display increased oxygen flux.

The membranes according to the invention are formed from a mixture of at least two different metal oxides wherein the multicomponent metallic oxide form a substantially cubic perovskite structure which demonstrates electron conductivity as well as oxygen ion conductivity at temperatures greater than about 500° C. These materials are commonly referred to as mixed conducting oxides.

Suitable mixed conducting oxides are represented by the structure

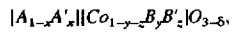

wherein A is chosen from the group consisting of Ca, Sr, Ba, and mixtures thereof;

A' is chosen from the group consisting of La, Y, Ce, Pr, Nd, Pm, Sm, Eu, Gd, Tb, Dy, Ho, Er, Tm, Yb, Lu, Th, U, and mixtures thereof;

B is chosen from the group consisting of Fe, Mn, Cr, V, Ti, and mixtures thereof;

B' is chosen from the group consisting of Cu, Ni, and mixtures thereof;

x is not less than about 0.0001 and not greater than about 0.1;

y is not less than about 0.002 and less than 0.05;

z is not less than about 0.0005 and not greater than about 0.3; and

δ is determined by the valence of the metals.

The cubic perovskite phase is substantially stable in air over the temperature range of 25°–950° C. Typically, the mixed conductor contains not less than about 90% cubic perovskite material, preferably not less than about 95% cubic perovskite material, and most preferably not less than about 98% cubic perovskite material.

The current invention is also directed towards the use of one or more membranes formed from the mixed conductors described. Suitable uses of such membranes include processes for the oxygen separation from oxygen-containing fluids, particularly air, or air diluted with other fluids.

DETAILED DESCRIPTION OF THE INVENTION

The present invention relates to novel mixed conductor membranes formed from mixed conducting oxides and processes employing such membranes. One such process is separating oxygen from oxygen-containing feeds at elevated temperatures. The membranes are conductors of oxygen ions and electrons, and are of a composition that forms a substantially cubic perovskite structure. The addition of specific transition metals at relatively low concentrations to mixed metal oxides which would otherwise form hexagonal phase materials stabilizes a cubic perovskite structure in the resulting mixed conducting membrane. Membranes fabricated from such material display increased oxygen flux. More particularly, a mixed conductor membrane wherein the membrane has the composition

 (1)

wherein A is chosen from the group consisting of Ca, Sr, Ba, and mixtures thereof; A' is chosen from the group consisting of La, Y, Ce, Pr, Nd, Pm, Sm, Eu, Gd, Tb, Dy, Ho, Er, Tm, Yb, Lu, Th, U, and mixtures thereof; B is chosen from the group consisting of Fe, Mn, Cr, V, Ti, and mixtures thereof; B' is chosen from the group consisting of Cu, Ni, and mixtures thereof; x is not less than about 0.0001 and not greater than about 0.1; y is not less than about 0.002 and less than 0.05; z is not less than about 0.0005 and not greater than about 0.3; and δ is determined by the valence of the metals, wherein the cubic perovskite phase is substantially stable in air over the temperature range of 25°–950° C., has been shown to exhibit unexpectedly high oxygen transport flux.

For ease of description, Ca, Sr, Ba, and mixtures thereof will be referred to hereinafter as "A cations" and La, Y, Ce, Pr, Nd, Pm, Sm, Eu, Gd, Tb, Dy, Ho, Er, Tm, Yb, Lu, Th, U, and mixtures thereof will be referred to as "A' cations". A cations and A' cations will be collectively referred to as "A site cations". Similarly, Fe, Mn, Cr, V, Ti, and mixtures thereof will be referred to as "B cations"; Cu, Ni, and mixtures thereof as "B' cations"; and B cations and B' cations collectively as "B site cations".

Applicants' discovery can be more fully understood by developing an understanding of the mechanism by which oxygen is ionically transported through the mixed conducting oxide membrane. The oxygen flux observed by conventional mixed conductor membranes is controlled by surface kinetic limitations and bulk diffusion limitations. Surface kinetic limitations are constraints to oxygen flux caused by one or more of the many steps involved in converting an oxygen molecule on the feed side of the mixed conductor membrane into mobile oxygen ions and converting the oxygen ions back to oxygen molecules on the permeate side of the mixed conductor membrane. Bulk diffusion limitations are constraints on oxygen flux relating to the diffusivity of oxygen ions through the membrane material.

Membranes composed substantially of cubic perovskite phase materials exhibit high overall oxygen flux. However, the cubic perovskite phase is not formed in all mixed conducting oxide materials or, if formed, is not stable over the required range of fabricating and operating conditions. Membranes formed from hexagonal phase materials exhibit little, if any, oxygen flux. To produce an effective membrane, therefore, the membrane composition must maintain a substantially high fraction of stable cubic perovskite phase in the membrane at operating conditions.

Applicants have discovered a composition which stabilizes the cubic perovskite phase in membranes with compositions previously unable to sustain a stable cubic perovskite phase over the range from ambient temperature and pressure in air to the conditions used for oxygen separation. In particular, slight amounts of A site cations and slight amounts of B site cations stabilize a substantially cubic perovskite structure in ABCoO materials. Additionally, the addition of slight amounts of A site cations and B site cations yields cubic perovskite phase materials in ABCoO materials which would otherwise yield hexagonal phase materials which produce membranes with low oxygen flux.

The present invention provides membranes which overcome these limitations, and permits the fabrication of mixed conductor oxide structures that are substantially cubic perovskite phase. Membranes made from such material exhibit relatively high overall bulk diffusion rates.

The claimed membranes comprise the composition described in Equation 1, having no connected through porosity, a substantially stable cubic perovskite structure in air at 25°–950° C., and the capability of conducting electrons and oxygen ions at operating temperatures.

The membranes of the current invention are formed from a mixture of at least two different metal oxides wherein the multicomponent metallic oxide demonstrates electron conductivity as well as oxygen ion conductivity at elevated temperatures. Multicomponent metallic oxides suitable for practicing the present invention are referred to as "mixed" conducting oxides because such multicomponent metallic oxides conduct electrons as well as oxygen ions at elevated temperatures. Suitable mixed conducting oxides are represented by the composition of Equation 1, which yield a substantially stable cubic perovskite structure in air at 25°–950° C. Materials described in the prior art, and materials quite similar to, but different from, the composition of Equation 1 produce primarily hexagonal phase or other phase material, with little cubic phase present. Such materials exhibit significantly lower oxygen fluxes.

Mixed conducting oxides of Applicants' invention are represented by the formula of Equation 1; preferably by the formula $[Sr_{1-x-x'}La_xCa_{x'}][Co_{1-y-z}B_yB'z]O_{3-\delta}$, where x' is less than about 0.01, x is greater than about 0.02 and less than about 0.1, and B, B', y, z and δ are as described by Equation 1; more preferably by the formula $[Sr_{1-x-x'}La_xCa_{x'}][Co_{1-y-z}Fe_yB'_z]O_{3-\delta}$, where B', x, y, z and δ are as described by Equation 1, and x' is less than about 0.01; and most preferably by the group consisting of $[Sr_{0.95-x'}La_{0.05}Ca_{x'}][Co_{1-y-z}Fe_yNi_z]O_{3-\delta}$, $[Sr_{0.95-x'}La_{0.05}Ca_{x'}][Co_{1-y-z}Mn_yNi_z]O_{3-\delta}$, $[Sr_{0.95-x'}La_{0.05}Ca_{x'}][Co_{1-y-z}Fe_yCu_z]O_{3-\delta}$, $[Sr_{0.95-x'}La_{0.05}Ca_{x'}][Co_{1-y-z}Mn_yCu_z]O_{3-\delta}$, and mixtures of the same, where $0.001 < x' < 0.01$, $0.0025 \leq y \leq 0.01$ and $0.001 \leq z \leq 0.05$, and δ is determined by the valence of the metals.

The thickness of the material can be varied to ensure sufficient mechanical strength of the membrane. As discussed previously, thinner membranes increase the overall bulk diffusion rate for a given membrane material. To exploit this phenomena, thinner membranes may be supported by one or more porous supports. The minimum thickness of unsupported mixed conductor membranes of Applicants' invention is about 0.01 mm, preferably about 0.05 mm, most preferably about 0.1 mm. The maximum thickness of unsupported mixed conductor membranes of Applicants' invention is about 10 mm, preferably about 2 mm, most preferably about 1 mm.

The minimum thickness of supported mixed conductor membranes of Applicants' invention is about 0.0005 mm, preferably about 0.001 mm, most preferably about 0.01 mm. The maximum thickness of supported mixed conductor membranes of Applicants' invention is about 2 mm, preferably about 1 mm, most preferably about 0.1 mm.

In addition to the increased oxygen flux, the membranes of the present invention exhibit stability over a temperature range from 25° C. to 950° C. and an oxygen partial pressure range from 1 to about $1 \times 10^{-6}$ atmosphere (absolute) without undergoing phase transitions. Substantially stable cubic perovskite structures include all structures with no less than 90% cubic perovskite phase material, preferably no less than 95% cubic perovskite phase material, and most preferably no less than 98% cubic perovskite phase material, which do not exhibit permanent phase transitions over a temperature range from 25° C. to 950° C. and an oxygen partial pressure range from 1 to about $1 \times 10^{-6}$ atmosphere (absolute).

Stabilization of the cubic perovskite phase is thought to be due to the unique composition discovered by Applicants. In contrast, phase transitions of previously reported materials make them unsuitable for practical devices that undergo temperature and pressure cycles, or which experience a range of conditions during their preparation and use. Membranes of quite similar compositions, for instance, form primarily hexagonal phase structures in the temperature range of 25–950° C., and the oxygen flux of such material is appreciably lower than the material of the present invention.

The membranes of the present invention can be used to recover oxygen from an oxygen-containing feed by delivering the oxygen-containing feed into a first compartment which is separated from a second compartment by the subject membrane, establishing a positive oxygen partial pressure difference between the first and second compartments by producing an excess oxygen partial pressure in the first compartment and/or by producing a reduced oxygen partial pressure in the second compartment; contacting the oxygen-containing feed with the membrane at a temperature greater than about 500° C. to separate the oxygen-containing feed into an oxygen-enriched permeate stream and an oxygen-depleted effluent stream and recovering the oxygen-enriched permeate stream.

A difference in oxygen partial pressure between the first and second compartments provides the driving force for effecting the separation when the process temperature is elevated to a sufficient temperature to cause oxygen in the oxygen-containing feed residing in the first compartment to adsorb onto the first surface of the membrane, become ionized via the membrane and to be transported through the membrane in the ionic form. An oxygen-enriched permeate is collected in the second compartment wherein ionic oxygen is converted into the neutral form by the release of electrons at the second surface of the membrane, in the second compartment.

A positive oxygen partial pressure difference between the first and second compartments can be created by compressing air, or other oxygen-containing fluid, in the first compartment to a pressure sufficient to recover the oxygen-enriched permeate stream at a pressure of greater than or equal to about one atmosphere. Typical pressures range from about 15 psia to about 250 psia and the optimum pressure will vary depending upon the amount of oxygen in the oxygen-containing feed. Conventional compressors can be utilized to achieve the necessary oxygen partial pressure. Alternately, a positive oxygen partial pressure difference between the first and second compartments can be achieved by evacuating the second compartment to a pressure sufficient to recover the oxygen-enriched permeate. Evacuation of the second compartment may be achieved mechanically, using compressors, pumps and the like; chemically, by reacting the oxygen- enriched permeate; thermally, by cooling the oxygen-enriched permeate; or by other methods known in the art. Additionally, the present invention may utilize an increase of oxygen partial pressure in the first compartment while simultaneously reducing the oxygen partial pressure in the second compartment, by the means described above. The relative pressures may also be varied during operation, as necessary to optimize oxygen separation, or necessitated by process which supply feeds to, or accept product streams from, the two compartments.

Recovery of the oxygen-enriched permeate may be effected by storing the substantially oxygen-enriched permeate in a suitable container or transferring the same to another process. The oxygen-enriched permeate typically comprises pure oxygen or high purity oxygen defined as generally containing at least about 90 vol % $O_2$, preferably more than about 95 vol % $O_2$ and especially more than 99 vol % $O_2$.

The following examples are provided to further illustrate Applicants' invention. Such examples are illustrative and are not intended to limit the scope of the appended claims.

EXAMPLES

Example 1

A mixed conductor membrane of nominal composition $|La_{0.05}Sr_{0.95}|CoO_{3-\delta}$ was prepared from a mixture of 4.28 g $La(C_2H_3O_2)_3 \cdot 1.5H_2O$ (available from Alfa, Ward Hill Mass.), 48.85 g $Sr(C_2H_3O_2)_2$ (available from Aesar, Seabrook N.H.) and 20.07 g $Co_3O_4$ (Aesar). The mixture was charged to a 500 ml polyethylene jar mill with 800 g of $ZrO_2$ media with 200 ml acetone, and rolled for 70 hours. The resulting slurry was decanted and vacuum distilled at room temperature until dry. The solids were calcined in air in an evaporating dish for 12 hours at 900° C., and an additional 6 hours at 1100° C. A 46.47 g portion of the resulting powder, 0.949 g polyvinyl butyral resin (Monsanto, St. Louis Mo.), 75 ml n-hexane and 35 ml ethanol were charged, with 400 g of $ZrO_2$ media to a jar mill, and milled for approximately 70 hours. The product powder was dried and screened to pass through a 325 mesh Tyler screen. X-ray diffraction (XRD) of the powder showed that the material was 100% cubic perovskite phase. Compositional analysis indicated that the material had a composition of $|A_{0.946}A'_{0.054}||Co_{0.99}B_{0.002}B'_{0.003}|O_{3-\delta}$.

A 4.06 g portion of the screened powder was pressed into a 1⅛" diameter disc under 32,000 psi applied pressure. The disc was fired in air at 405° C. for 15 minutes, the temperature increased to 1200° C. over the course of 13 hours and maintained for 1 hour, then cooled to ambient temperature.

The disc was polished on both sides with 500 grit SiC to a final thickness of 0.97 mm. The electrical resistance of the disc was measured to be approximately 40 ohms. The disc was bonded to a 1 inch outside diameter mullite tube with a ⅛" thick Pyrex ring, and the exposed surface area measured to be approximately 2 cm².

The mullite tube, disk, and gas handling equipment were placed in a thermostatically controlled electric heater. The disc was heated in stagnant air to 960° C. as indicated by a thermocouple affixed to the mullite tube approximately 1 cm from the tube/disk bond, held for 20 minutes, then cooled to 850° C. at a rate of 1° C./minute. Air flow at the rate of 1.0 l/min was initiated on one side of the disk, and helium permeate feed flow at 205 cm³/min started on the other side of the disc. The effluent helium permeate was analyzed using on-line gas chromatography, and the helium permeate feed flow rate adjusted to maintain approximately 1% oxygen content in the permeate. The permeate was also analyzed for nitrogen, to permit correction for any air leakage into the permeate stream.

Oxygen flux of the membrane was calculated using the expression:

$$q_{O_2} = |q_P * (x_{O_{2P}} - 0.256 * x_{N_{2P}}) * P_0/760 * 273/T_0|/100$$

where $q_{O_2}$=Oxygen flux (cm3/min);

$q_P$=Permeate exhaust flow rate (cm3/min);

$x_{O_{2P}}$=Oxygen concentration in permeate exhaust (%);

$x_{N_{2P}}$=Nitrogen concentration in permeate exhaust (%);

$P_0$=Atmospheric pressure (mm Hg, abs.); and $T_0$=Ambient temperature (degrees K).

Oxygen flux was normalized to correct for membrane disk thickness variations using the expression:

$$q'_{O_2} = q_{O_2} * L$$

where $q'_{O_2}$=Oxygen flux normalized for thickness (cm3/min-mm);

$q_{O_2}$=Oxygen flux (cm3/min); and

L=Thickness of membrane disk (mm).

Oxygen flux per unit area was calculated by dividing the oxygen flux normalized for thickness ($q'_{O_2}$) by the membrane disk area, measured in cm².

Operating characteristics of the disk were evaluated for over 500 hours at various temperatures and gas flow rates. Test data are supplied in Table 1, below. Ambient temperature ($T_0$) was maintained at 293° K. for all data points. The air feed rate was maintained at 1000 sccm, except for the tests at 530 and 534 hours, which were 0 and 2000 sccm, respectively.

The data of Table 1 show the excellent long-term stability of the material in air at elevated temperatures, and the high oxygen flux. High flux rates are maintained over a broad range of air flows (0 to 2000 sccm). The test at 530 hours is particularly notable, exhibiting very rapid oxygen diffusion from stagnant air. The runs at 1 and 512 hours also display the materials high oxygen flux even when the permeate oxygen level is high, and the oxygen partial pressure differential over the material is therefore low.

TABLE 1

| Time hours | Membrane Temp Deg. C. | Po mm Hg | Permeate sccm | Permeate analysis *O2P | Permeate analysis *N2P | qO2 cc/min | q'O2 cc/cm2/ min |
|---|---|---|---|---|---|---|---|
| 1 | 850 | 740.2 | 212 | 3.354 | 0.024 | 6.247 | 3.124 |
| 2.5 | 850 | 740.2 | 758 | 1.259 | 0.000 | 8.400 | 4.200 |
| 6.5 | 850 | 740.2 | 1010 | 1.001 | 0.000 | 8.899 | 4.450 |
| 24 | 850 | 744.4 | 1030 | 0.970 | 0.000 | 8.844 | 4.422 |
| 32 | 850 | 744.4 | 1050 | 0.941 | 0.000 | 8.747 | 4.373 |
| 47 | 850 | 743.7 | 1050 | 0.922 | 0.000 | 8.562 | 4.281 |
| 51 | 800 | 743.7 | 675 | 0.954 | 0.000 | 5.695 | 2.848 |
| 53 | 800 | 743.7 | 680 | 0.937 | 0.000 | 5.635 | 2.818 |
| 55 | 750 | 743.7 | 473 | 0.821 | 0.008 | 3.426 | 1.713 |
| 56 | 750 | 743.7 | 389 | 0.966 | 0.009 | 3.315 | 1.658 |
| 72 | 700 | 743.4 | 228 | 0.885 | 0.017 | 1.775 | 0.888 |
| 74 | 800 | 743.4 | 663 | 0.893 | 0.000 | 5.234 | 2.617 |
| 75 | 800 | 743.4 | 671 | 0.897 | 0.000 | 5.321 | 2.660 |
| 76 | 900 | 743.4 | 1070 | 0.993 | 0.000 | 9.393 | 4.697 |
| 79 | 900 | 742.0 | 1120 | 0.976 | 0.000 | 9.646 | 4.823 |
| 96 | 900 | 738.9 | 1100 | 1.090 | 0.009 | 10.513 | 5.257 |
| 98 | 900 | 738.9 | 1130 | 1.068 | 0.009 | 10.582 | 5.291 |
| 100 | 850 | 738.9 | 1140 | 0.850 | 0.008 | 8.494 | 4.247 |
| 144 | 850 | 739.0 | 990 | 0.971 | 0.013 | 8.419 | 4.210 |
| 168 | 850 | 743.6 | 976 | 0.957 | 0.013 | 8.231 | 4.115 |
| 192 | 850 | 745.0 | 972 | 0.959 | 0.013 | 8.230 | 4.115 |
| 216 | 850 | 743.7 | 988 | 0.965 | 0.016 | 8.396 | 4.198 |
| 240 | 850 | 740.6 | 981 | 0.945 | 0.016 | 8.129 | 4.065 |
| 264 | 850 | 734.4 | 990 | 0.948 | 0.015 | 8.163 | 4.082 |
| 336 | 850 | 734.0 | 996 | 0.944 | 0.015 | 8.174 | 4.087 |
| 360 | 850 | 734.8 | 986 | 0.963 | 0.012 | 8.271 | 4.135 |
| 384 | 850 | 735.6 | 992 | 0.978 | 0.016 | 8.451 | 4.226 |
| 408 | 850 | 737.4 | 992 | 0.978 | 0.016 | 8.472 | 4.236 |
| 432 | 850 | 732.4 | 996 | 0.978 | 0.009 | 8.464 | 4.232 |
| 504 | 850 | 742.0 | 972 | 1.008 | 0.016 | 8.610 | 4.305 |
| 507 | 850 | 742.0 | 1130 | 0.881 | 0.015 | 8.746 | 4.373 |
| 509 | 850 | 742.0 | 761 | 1.248 | 0.025 | 8.337 | 4.169 |
| 510 | 850 | 742.0 | 447 | 1.923 | 0.034 | 7.550 | 3.775 |
| 512 | 850 | 742.0 | 147 | 4.338 | 0.133 | 5.583 | 2.791 |
| 528 | 850 | 743.6 | 968 | 1.008 | 0.019 | 8.587 | 4.293 |
| 530 | 850 | 743.6 | 973 | 0.982 | 0.015 | 8.416 | 4.208 |
| 532 | 850 | 743.6 | 977 | 1.004 | 0.015 | 8.641 | 4.320 |
| 534 | 850 | 743.6 | 974 | 0.978 | 0.019 | 8.382 | 4.191 |
| 535 | 850 | 743.6 | 972 | 0.955 | 0.021 | 8.162 | 4.081 |
| 552 | 850 | 740.9 | 977 | 0.985 | 0.020 | 8.435 | 4.217 |
| 557 | 850 | 745.3 | 2040 | 0.483 | 0.010 | 8.687 | 4.343 |
| 558 | 850 | 745.3 | 1520 | 0.637 | 0.014 | 8.533 | 4.267 |
| 560 | 850 | 745.3 | 504 | 1.696 | 0.033 | 7.538 | 3.769 |
| 577 | 900 | 750.3 | 505 | 1.810 | 0.024 | 8.128 | 4.064 |
| 579 | 900 | 750.3 | 999 | 1.070 | 0.012 | 9.510 | 4.755 |
| 581 | 900 | 750.3 | 1510 | 0.754 | 0.009 | 10.128 | 5.064 |
| 583 | 900 | 750.3 | 2040 | 0.590 | 0.000 | 10.739 | 5.370 |

Comparative Example 1(a)

A different, although similar mixed conductor membrane of nominal composition $|La_{0.05}Sr_{0.95}|CoO_{3-\delta}$ was prepared with different levels of A site cations and B site cations, which did not permit formation of substantially cubic perovskite phase material.

The material was prepared in a manner similar to the examples described in U.S. Pat. No. 5,061,682, incorporated herein by reference. 1206.21 grams of $Sr(NO_3)_2$ (Mallinckrodt), 24.44 grams of $La_2O_3$ (Alfa), and 353.76 gram of cobalt metal powder (Aldrich) were added to 1.7 liters of deionized water.

A portable spray-dryer was used to spray-dry the ceramic precursor solution described above. A suitable portable spray-dryer is available from Niro Atomizer of Columbia, Md. The spray-dryer includes a centrifugal atomizer capable of speeds up to 40,000 rpm. The atomizer sits near the top of a drying chamber that has an inner diameter of 2 feet, 7 inches, with a 2-foot cylindrical height and a 60° conical bottom. The centrifugal atomizer and drying chamber are made from stainless steel. The drying chamber is coupled to an electric air heater for providing drying air to the drying chamber. The drying air is drawn through the drying chamber by a blower positioned downstream from the drying chamber. The spray-dryer includes a cyclone separator that receives the drying air and dry product from the bottom of the drying chamber. The cyclone separator separates the dry product from the exhausted drying air. The bottom of the cyclone separator includes an outlet that allows the dried particles to gravitate into a vertically oriented tube furnace capable of maintaining an air temperature of about 300°–450° C. The dried particles are pyrolyzed in the tube furnace. The tube furnace has a height sufficient to provide a residence time for the freely gravitating particles of about 0.5 to 2.0 seconds. The bottom of the tube furnace communicates with a collection chamber where the ceramic particles are collected.

The ceramic precursor solution described above was introduced into the spray-dryer chamber at a flow rate of about 1.8 liters per hour. The centrifugal atomizer spinning at about 30,000 RPM broke up the precursor solution into small droplets having a diameter on the order of about 20–50 microns. The air flow through the drying chamber and cyclone ranged between about 35–40 standard cubic feet per minute. The air entering the drying chamber was preheated to about 375° C. As the small droplets were forcefully convected toward the bottom of the drying chamber, they became fully dehydrated down to a critical state of dehydration such that their diameter was reduced to about 10.0 microns or less. The temperature of the drying gas at the bottom of the drying chamber was approximately 125° C., which ensures substantially all the water was removed from the particles in the spray-dryer. The dried powder and drying air were then separated from each other in the cyclone separator. The separated powder fell due to gravity through the tube furnace, which was preheated to about 490° C. The particles' residence time in the furnace ranged from about 0.5–2.0 seconds. The temperature in the tube furnace initiated the exothermic anionic oxidation-reduction reaction between the nitrate ions and the oxides in the individual particles. The combustion by-products ($CO_2$ and water vapor) were passed through the system and out the exhaust, while the reacted particles dropped into the collection jar. About 60.0 grams of particles were collected, having an average particle size of approximately 5.0 microns.

The resulting powders were analyzed, and XRD indicated that the material was hexagonal in structure and had the composition $|A_{0.976}A'_{0.024}||CO_{0.999}B_{0.0002}B'_{0.001}|O_{3-\delta}$. Two disks were pressed from the powder, and prepared and tested in the manner described above. Test results are included as Table 2, below. As in Example 1, ambient temperature was maintained at 293° K. The air feed rate was 500 sccm for Example 1(a)(i), and 510 sccm for Example 1(a)(ii).

TABLE 2

| Example 1(a)(i) Membrane thickness = 1.020 mm | | | | | | | |
|---|---|---|---|---|---|---|---|
| Time | Temp | Atm P | Permeate | Permeate analysis | | %O2 | %O2 cc/cm2/ |
| hours | Deg. C. | mm Hg | sccm | % O2 | % N2 | cc/min | min |
| 1 | 800 | 740.0 | 492 | 0.234 | 0.817 | 0.113 | 0.057 |
| 4 | 850 | 740.0 | 314 | 0.354 | 1.238 | 0.108 | 0.054 |
| Example 1(a) (ii) Membrane thickness = 1.000 mm | | | | | | | |
| 1 | 800 | 740.0 | 310 | 0.536 | 1.847 | 0.178 | 0.089 |
| 4 | 800 | 740.0 | 310 | 0.840 | 2.826 | 0.328 | 0.164 |

Examples 2 and 2(a)

Two mixed conductor powders of nominal composition $|La_{0.05}Sr_{0.95}|CoO_{3-\delta}$ were prepared with different levels of A site cations and B site cations, to identify composition effects on cubic perovskite structure formation. The material was prepared in a manner similar to Examples 1 and 1(a), except that the ratio of starting materials was adjusted slightly. The resulting screened powders were analyzed by XRD.

Example 2 was prepared by the method described in Example 1, had the composition $|A_{0.945}A'_{0.055}|[Co_{0.97}B_{0.021}B'_{0.003}]O_{3-\delta}$, and cubic perovskite structure.

Comparative Example 2(a) was prepared by the method described in Example 1(a), had the composition $|A_{0.944}A'_{0.056}||Co_{0.999}B_{0.0002}B'_{0.001}|O_{3-\delta}$, and hexagonal structure.

We claim:

1. A fluid separation device utilizing at least one membrane, wherein said membrane comprises a composition of substantially cubic perovskite structure, represented by the empirical formula $$|A_{1-x}A'_x||Co_{1-y-z}B_yB'_z|O_{3-\delta},$$

wherein

A is chosen from the group consisting of Ca, Sr, Ba, and mixtures thereof;

A' is chosen from the group consisting of La, Y, Ce, Pr, Nd, Pm, Sm, Eu, Gd, Tb, Dy, Ho, Er, Tm, Yb, Lu, Th, U, and mixtures thereof;

B is chosen from the group consisting of Fe, Mn, Cr, V, Ti, and mixtures thereof;

B' is chosen from the group consisting of Cu, Ni, and mixtures thereof;

x is not less than about 0.0001 and not greater than about 0.1;

y is not less than about 0.002 and less than 0.05;

z is not less than about 0.0005 and not greater than about 0.3; and

δ is determined by the valence of the metals.

2. The device of claim 1 wherein said membrane separates a first compartment containing an oxygen-containing fluid from a second compartment containing a permeate.

* * * * *